Figure 1:
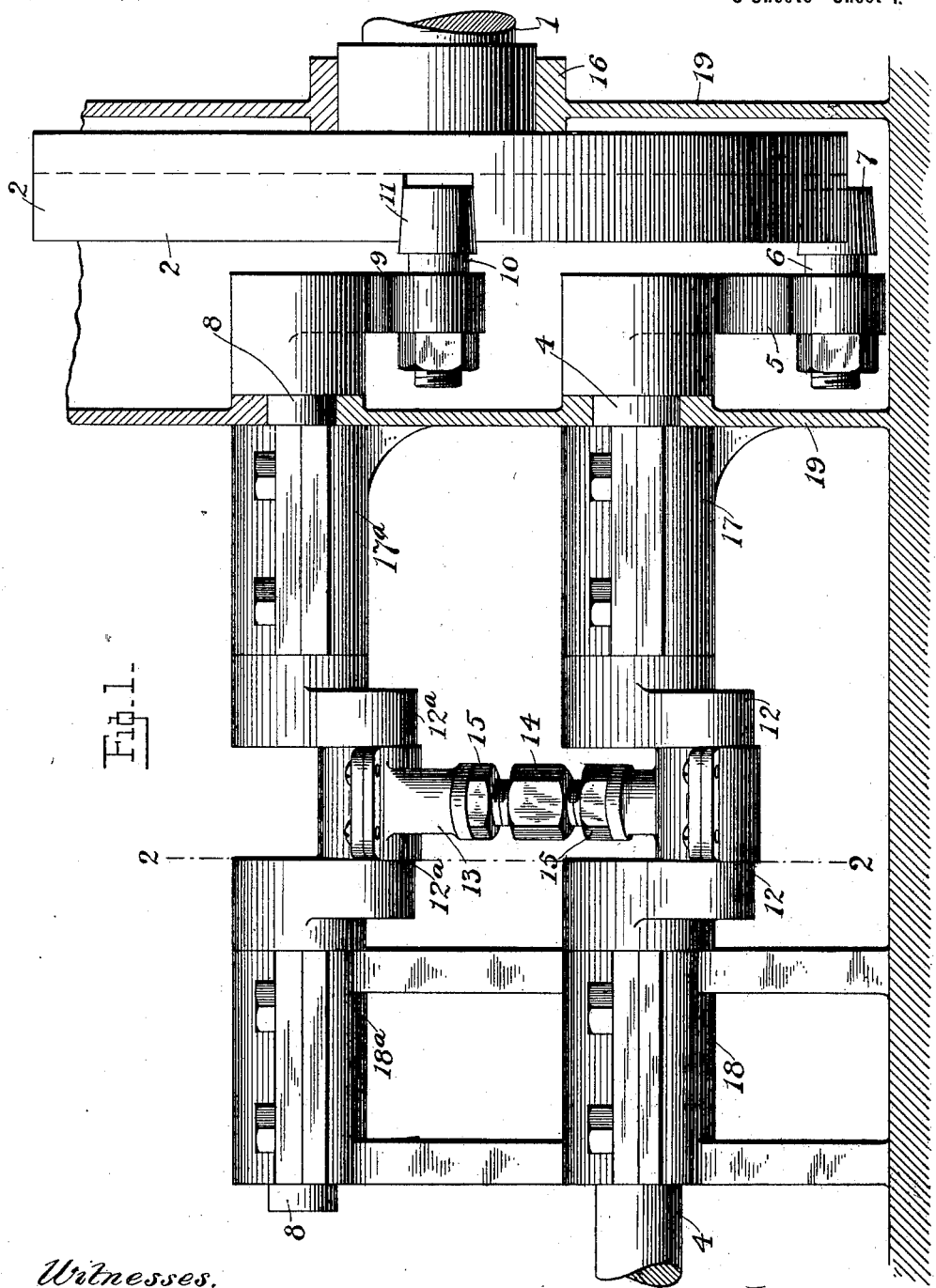

No. 703,396. Patented July 1, 1902.
H. H. FEFEL.
MECHANICAL MOVEMENT.
(Application filed Oct. 30, 1901.)
(No Model.) 3 Sheets—Sheet 1.

Witnesses. Inventor.

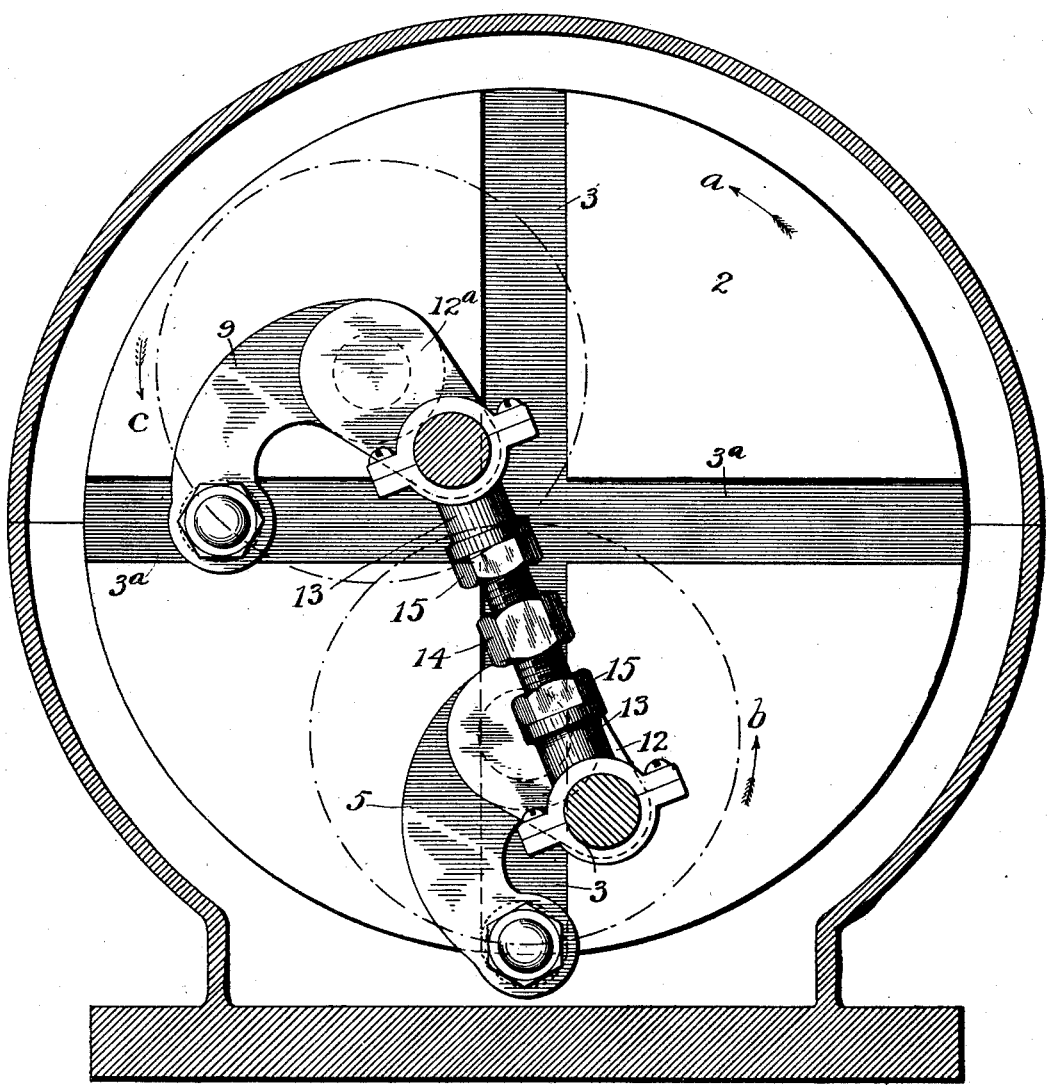

No. 703,396. Patented July 1, 1902.
H. H. FEFEL.
MECHANICAL MOVEMENT.
(Application filed Oct. 30, 1901.)
(No Model.) 3 Sheets—Sheet 3.
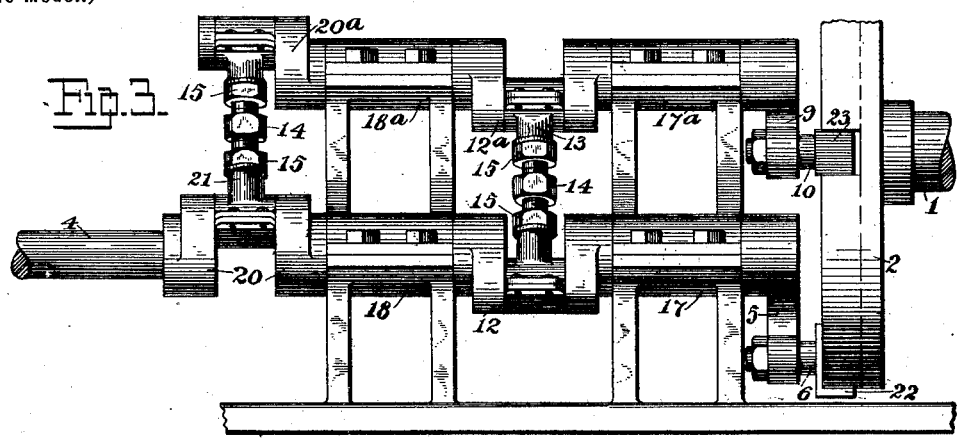
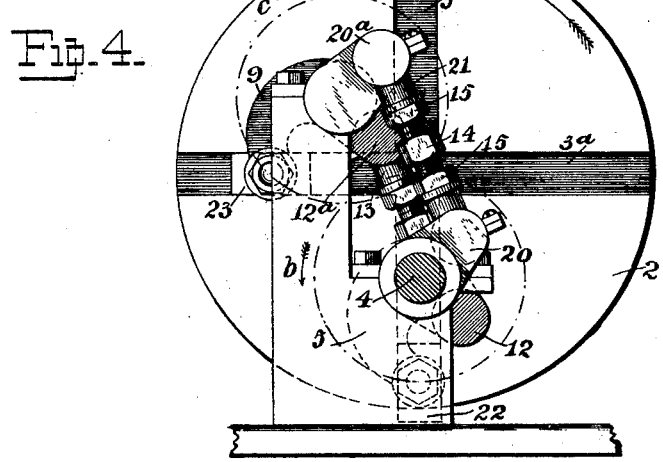
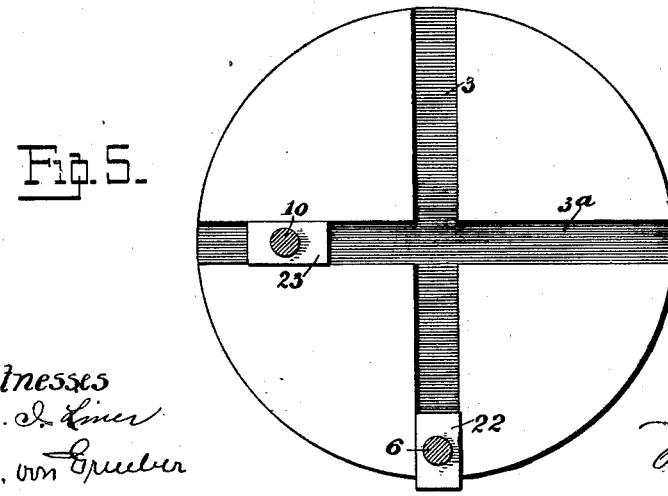
Witnesses
Inventor.
Henry H. Fefel
By Knight Bros.
Attys.

UNITED STATES PATENT OFFICE.

HENRY H. FEFEL, OF NEW YORK, N. Y., ASSIGNOR, BY MESNE ASSIGNMENTS, TO NEW YORK-PITTSBURGH MANUFACTURING COMPANY, OF NEW YORK, N. Y., A CORPORATION OF NEW YORK.

MECHANICAL MOVEMENT.

SPECIFICATION forming part of Letters Patent No. 703,396, dated July 1, 1902.

Application filed October 30, 1901. Serial No. 80,515. (No model.)

*To all whom it may concern:*

Be it known that I, HENRY H. FEFEL, a citizen of the United States, residing in the borough of Bronx, in the city and State of New York, have invented certain new and useful Improvements in Mechanical Movements, of which the following is a specification.

The subject of this invention is a mechanical movement by which multiplied rotary motion is transmitted from a driving-shaft to a driven shaft and all inequality of motion due to the passage of cranks over their dead-centers is eliminated.

To this end the invention consists in the combination of a driving-shaft, a radially-grooved trammel-disk carried thereby, a crank-shaft driven by the engagement of its wrist in a radial groove of the trammel-disk, and a supplementary crank-shaft likewise driven by the trammel-disk and coupled to the first driven shaft by cranks and a connecting-rod, so as to serve as an intermediary and supplementary device for transmitting power from the trammel-disk to the primary driven shaft. The grooves in the trammel-disk in which the driving-cranks of the two driven shafts respectively engage being at an angle to each other, it results that the driven shafts mutually coöperate to carry their respective driving-cranks over their dead-centers with perfectly-uniform rotation, as hereinafter described.

In the accompanying drawings, Figure 1 is a side elevation of a portion of the driving-shaft, the trammel-disk, and the coupled shafts driven thereby, showing in section a casing in which the trammel-disk and driving-cranks are mounted. Fig. 2 is a vertical transverse section on the line 2 2, Fig. 1, showing the casing also in section or the front wall thereof removed, so as to expose the face of the radially-grooved trammel-disk and the driving-cranks operated thereby. Fig. 3 is a side elevation showing a modification. Fig. 4 is an end view of the same, showing the driven shaft in section. Fig. 5 is a face view of the trammel, showing slides working in the grooves thereof and in section the wrist-pins carried by said slides.

1 represents a portion of the primary driving-shaft or engine-shaft, and 16 one of the fixed bearings thereof.

2 represents the trammel-disk, mounted rigidly on the end of the driving-shaft 1, and 3 $3^a$ diametrical grooves in the face of the said disk, crossing one another at right angles.

4 represents the primary driven crank-shaft; 5, its driving-crank; 6, the wrist-pin thereof, and 7 an antifriction-roller mounted on the said wrist-pin and traveling in the radial groove 3 of the trammel-disk.

8 represents a second crank-shaft, 9 its driving-crank, and 10 the wrist-pin thereon having an antifriction-roller 11 mounted thereon and traveling in the groove $3^a$, which extends across the face of the trammel-disk 2 at right angles to the groove 3.

The crank-shafts 4 and 8 are provided with parallel cranks 12 and $12^a$, which are coupled together by a connecting-rod 13, constructed with a right and left screw connection 14 for adjusting the length of the rod to bring the cranks 12 and $12^a$ into parallelism. Jam-nuts 15 15 on the right and left screw 14 fix the said screw in any position of adjustment.

17 $17^a$ represent inner fixed bearings of the respective crank-shafts 4 and 8, and 18 $18^a$ outer fixed bearings of the same. The trammel-disk 2 and the driving-cranks 5 and 9 of the crank-shafts are inclosed in a casing, 19, which is supplied with oil, in which the lower edge of the trammel-disk may be immersed to any desirable depth, so as to supply constant lubrication to the radial grooves 3 $3^a$ of the trammel-disk and the crank-pin rollers 7 11 working therein.

In order to insure more perfect equality in speed of rotation of the shaft 4, I prefer to couple the shafts 4 and 8 by a second pair of parallel cranks 20 $20^a$ and adjustable connecting-rod 21, as shown in Figs. 3 and 4 of the drawings, the cranks 20 and $20^a$ on the respective crank-shafts 4 and 8 being set at an angle, preferably a right angle to the respective cranks 12 and $12^a$ on said shafts. The crank $20^a$ is thus made to act with full effect on the crank 20 and shaft 4 at points in the rotation when the coupling-crank $12^a$ is comparatively ineffective, and the rotative force transmitted to the driven crank-shaft 4 by the intermediary crank-shaft 8 is thereby equalized in all parts of the rotation.

Figs. 3, 4, and 5 also illustrate the use of slides 22 23, traveling in the grooves 3 3ᵃ of the trammel-disk, and in which the wrist-pins 6 and 10 of the respective driving-cranks 5 and 9 are pivoted as a substitute for the anti-friction-rollers 7 and 11 on said wrist-pins.

Operation: From the above description it will be apparent that the trammel-disk rotating in the direction indicated by the arrow $a$, Fig. 2, will carry the wrist-pin 6 of the driving-crank 5 in the circle indicated in the dotted line and in the direction indicated by the arrow $b$, the said crank-pin 6 traversing the groove 3 completely across the face of the trammel-disk and making two circuits in every complete revolution of the trammel-disk, so that the crank-shaft 4 is driven at a speed double that of the driving or engine shaft 1. In like manner the wrist-pin 10 of the crank 9 of the secondary crank-shaft 8 is carried by the groove 3ᵃ in the face of the trammel-disk in the circle indicated by the dotted line and in the direction shown by the arrow $c$, imparting two complete revolutions to the shaft 8 at every revolution of the engine-shaft 1. It will further appear that while the crank-shaft 4 is driven directly by the trammel-disk, the two crank-shafts 4 and 8 being coupled together by their parallel cranks 12 12ᵃ and connecting-rod 13, the secondary crank-shaft 8 acts as an intermediary and supplementary device for transmitting power from the trammel-disk 2 to the primary driven shaft 4, and the groove 3ᵃ, which drives the crank 9, being at right angles to the groove 3, by which the crank 5 of the shaft 4 is driven, and the coupled cranks 12 12ᵃ being at an angle to the respective driving-cranks 5 and 9 the crank-shafts mutually coöperate, each carrying the other over the dead-centers, which would otherwise occur in the driving movement between the trammel-disk and the respective driving-cranks 5 and 9. The second pair of parallel coupling-cranks 20 20ᵃ, connected by the rod 21, being mounted on the respective shafts 4 and 8 at an angle, preferably a right angle, to the coupling-cranks 12 and 12ᵃ serve to transmit rotative force from the shaft 8 to the shaft 4 while the first pair of coupling-cranks 12 12ᵃ are least effective. By this means the smooth, even, and uniform rotation of the shafts is further promoted.

While the primary purpose of my invention is for driving propellers of boats and vessels of every class, it is not limited to this purpose or use, but is valuable for many other purposes where it is desired to transmit rotary movement with multiplied speed and to completely eliminate any loss of power or inequality of motion resulting from the operation of cranks in passing their dead-centers.

While I have described my invention as applied to the rotation of a driven shaft 4 at increased speed from a driving-shaft 1, it is apparent that the shaft 4 may constitute the driving-shaft and 1 the driven shaft, to which rotation is imparted at reduced speed.

Having thus described my invention, the following is what I claim as new therein and desire to secure by Letters Patent:

1. The combination of a driving-shaft, a radially-grooved trammel-disk carried thereby; a pair of crank-shafts each having a driving-crank engaging by its wrist-pin in one of the radial grooves of the trammel-disk; coupling-cranks on said crank-shafts; and a connecting-rod mounted at its ends on the coupling-cranks of the respective crank-shafts, whereby one of said crank-shafts through which power may be transmitted is driven directly by the trammel-disk and the second crank-shaft acts as an intermediary driving device between the trammel-disk and the primary driven shaft.

2. The combination of a driving-shaft; a radially-grooved trammel-disk carried thereby; a pair of crank-shafts having driving-cranks whose wrist-pins engage in grooves of different diameters of the trammel-disk; parallel cranks on the respective crank-shafts; and a rod connecting said parallel cranks, whereby the coupled crank-shafts are driven continuously from the trammel-disk and dead-centers avoided, as explained.

3. The combination of the driving-shaft 1; a radially-grooved trammel-disk 2 mounted thereon; a shaft 4, through which power may be transmitted, having a crank 5 engaging in a groove 3 of the trammel-disk so that said shaft will be driven directly from the trammel-disk; a second crank-shaft 8, having a crank 9 engaging with a groove 3ᵃ of the trammel-disk on a different diameter from that by which the first crank-shaft is driven; parallel cranks 12, 12ᵃ on the shafts 4 and 8; and a connecting-rod 13 between said cranks; whereby the second crank-shaft 8 serves as an intermediary and supplementary driving device between the trammel-disk 2 and crank-shaft 4, as explained.

4. The combination of the driving-shaft 1; a radially-grooved trammel-disk 2, mounted thereon; a shaft 4, through which power may be transmitted, having a crank 5 driven by engagement in a groove 3 of the trammel-disk; a second crank-shaft 8 also having a crank 9, driven by engagement in a groove of the trammel-disk; and two pairs of coupling-cranks 12, 12ᵃ and 20, 20ᵃ, mounted respectively at different angles on the shafts 4 and 8, and connected by rods 13 and 21; whereby the second crank-shaft 8 acts as an intermediary and supplementary driving device between the trammel-disk and the primary driven shaft 4 and operates thereon with uniform rotative force, as described.

HENRY H. FEFEL.

Witnesses:
WM. E. KNIGHT,
J. GREEN.